April 28, 1964 R. W. BORROWDALE 3,130,632
CAMERA ADJUSTMENT
Filed Dec. 7, 1960 4 Sheets-Sheet 2

INVENTOR.
RUSSELL W. BORROWDALE
BY
RICHEY, McNENNY & FARRINGTON
H. F. McNenny
ATTORNEYS April 28, 1964 R. W. BORROWDALE 3,130,632
CAMERA ADJUSTMENT Filed Dec. 7, 1960 4 Sheets-Sheet 3

INVENTOR.
RUSSELL W. BORROWDALE
BY
RICHEY, McNENNY & FARRINGTON
ATTORNEYS

April 28, 1964  R. W. BORROWDALE  3,130,632
CAMERA ADJUSTMENT
Filed Dec. 7, 1960  4 Sheets-Sheet 4
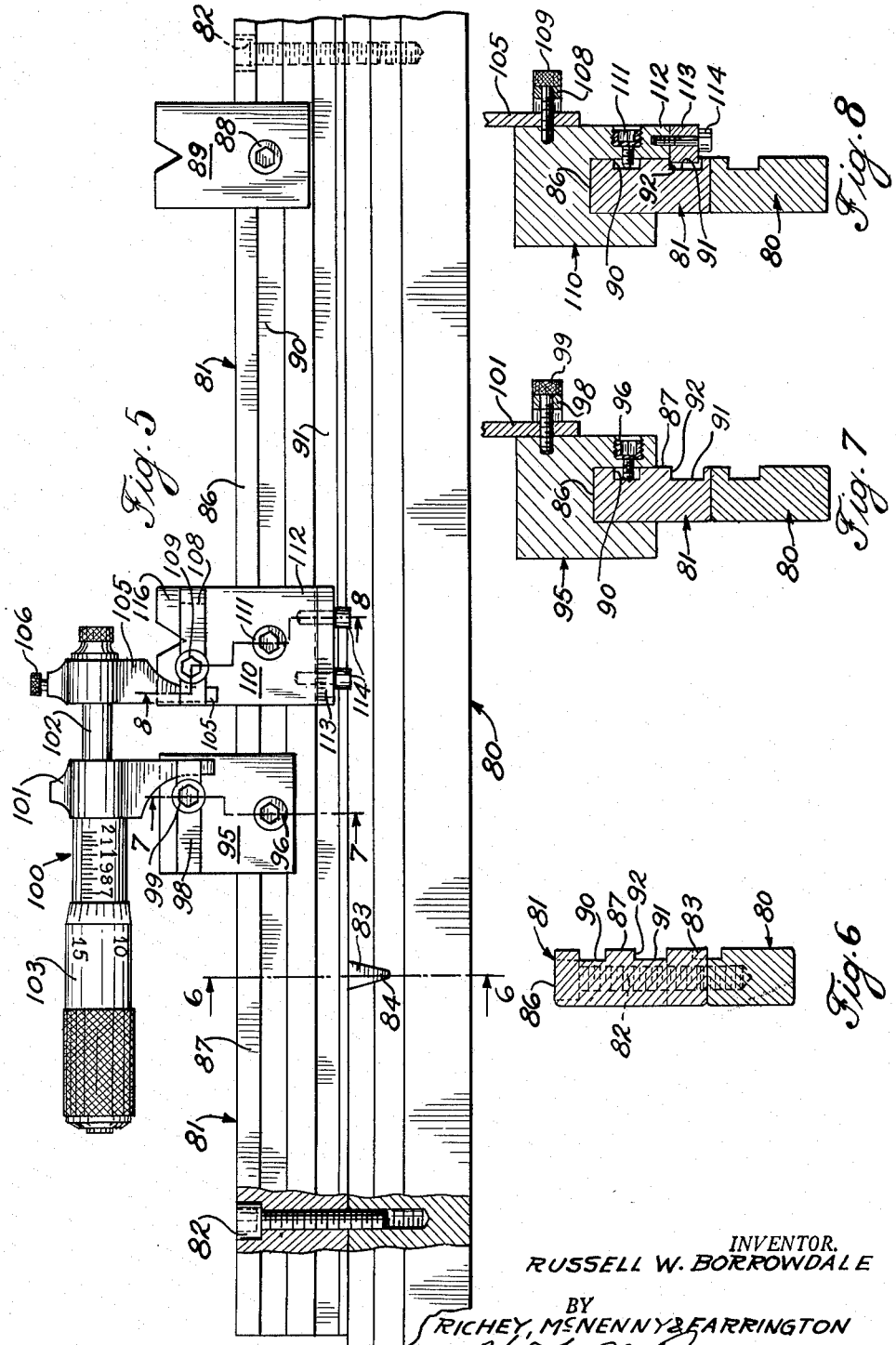
INVENTOR.
RUSSELL W. BORROWDALE
BY
RICHEY, McNENNY & FARRINGTON
ATTORNEYS

3,130,632
CAMERA ADJUSTMENT
Russell W. Borrowdale, 640-48 W. 65th St.,
Chicago 21, Ill.
Filed Dec. 7, 1960, Ser. No. 74,260
3 Claims. (Cl. 88—24)

This invention relates to photographic apparatus, and more particularly to an improved focusing adjustment for commercial cameras of the type used for photocopying, photo-engraving, and similar processes.

In a typical commercial camera, the film holder is fixed while the camera lens and the copyboard are each separately movable along rails to allow accurate adjustments for reduction or enlargement of the material being reproduced. In order to make the accurate changes in size of the image required for detail work, it is necessary that the copyboard be precisely positioned, and to insure a sharp reproduction, that the lens be very accurately focused. Naturally, to make such adjustments is a lengthy and time consuming process which normally must be repeated from job to job. Therefore, it is desirable that once a setting has been obtained for both the copyboard and the lens, that these positions can be found at a later time without repeating the complete focusing and resetting procedure each time. Heretofore, these cameras have been equipped with elaborate scales and verniers for the lens and copyboard in an effort to accurately locate and record the position of the lens and copyboard to aid in resetting these devices at the proper position. Such efforts have included precision ruled scales, dial indicators, and other expensive and complicated equipment. Such devices require careful and time consuming setting on the part of the operator in an effort to obtain the precise setting. In addition, such devices are delicate and tend to wear and get out of adjustment unless carefully maintained and operated.

Therefore, it is an object of the present invention to provide a device which allows resetting the focusing and size adjustments of the camera without any need on the part of the operator to read scales, dial indicators, or the like.

It is also an object of the present invention to provide a resetting device which allows the lens and copyboard to be accurately reset to a previously located position within $\frac{1}{1000}$ of an inch with a minimum of operator attention and skill.

It is also an object of the present invention to provide a camera resetting and positioning device in which the lens and copyboard are located by means of a plunger which engages a detent block which has previously been adjusted to the desired position.

Another object of this invention is to provide a camera resetting and positioning device in which the lens and copyboard are located and positioned by means of a spring-loaded locking plunger which may selectively engage any one of a number of individual detent blocks which have been previously set to the desired position.

Another object of this invention is to provide a camera resetting and positioning device in which the lens carrier and copyboard carrier are located and positioned by means of positively locking detents which can be so arranged that a carrier can be positioned by the detents with a spacing between adjacent positions which is smaller than the dimension of the locking detents.

Another object of this invention is to provide a camera resetting and positioning device in accordance with the preceding objects which allows a rapid and precise micrometer adjustment of the detent blocks to allow for the thickness of overlays and the like.

Still another object of this invention is to provide a camera resetting and positioning device in accordance with the preceding objects which allows detent block to be precisely adjusted and located to a particular position, after which the detents can be conveniently removed, stored and quickly replaced to the same precise position.

Still additional objects and advantages of this invention will become apparent to those skilled in the art upon reading the following detailed description of the invention which is shown in the accompanying drawings in which:

FIGURE 5 is a fragmentary elevational view of the removable rail and micrometer positioned detent block;

FIGURE 6 is a cross-sectional view taken on line 6—6 of FIGURE 5;

FIGURE 7 is a cross-sectional view taken along line 7—7 of FIGURE 5; and

FIGURE 8 is a cross-sectional view taken along line 8—8 of FIGURE 5.

Figure 1:
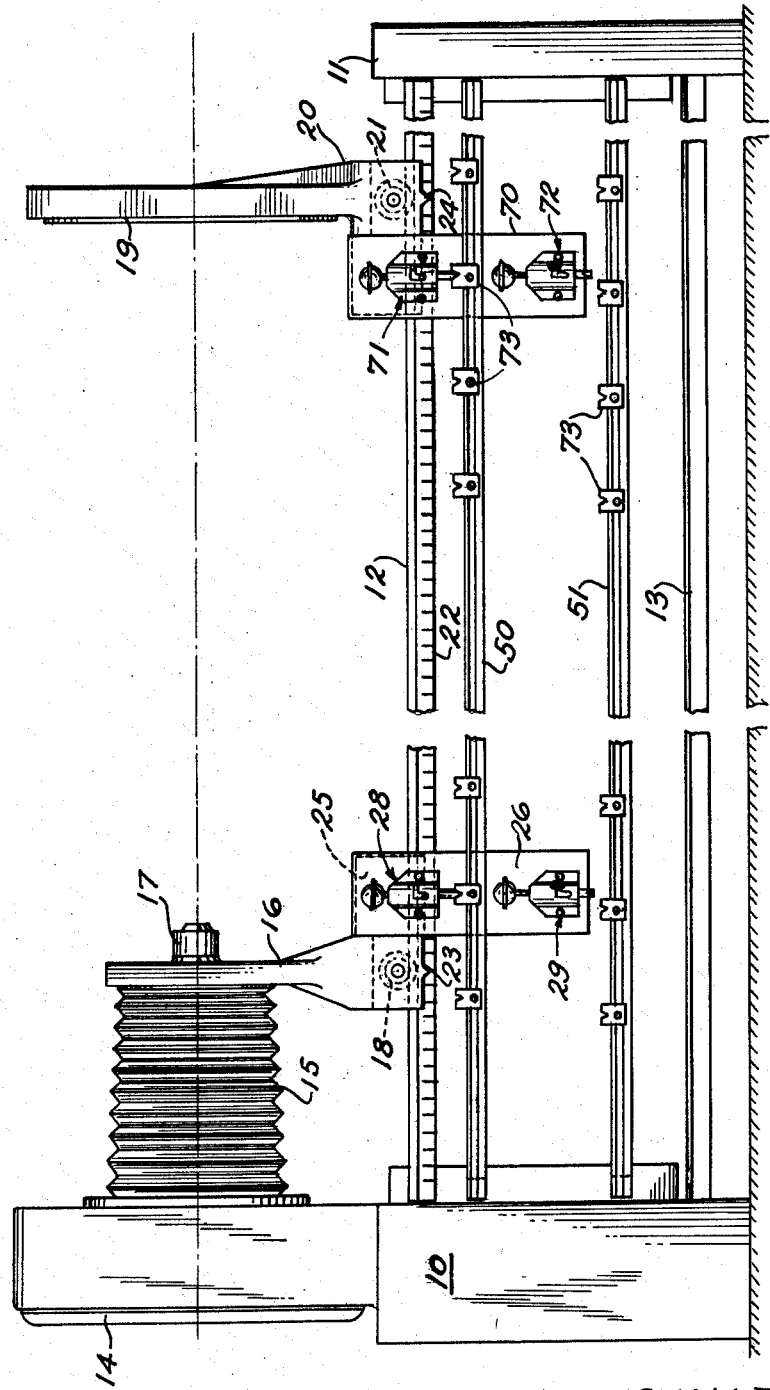
FIGURE 1 is a side elevational view of a camera incorporating the resetting device of the present invention.

Referring now more particularly to FIGURE 1, the camera will be seen to include a pair of upright frame members 10 and 11 which are connected by upper and lower rails 12 and 13, respectively, secured at each end to the frame members. The film holder 14 is secured on top of upright frame member 10, and is connected by means of bellows 15 to the lens carrier 16 which in turn supports the camera lens 17. The lens carrier 16 is mounted by means of roller wheels 18 to move along upper rails 12 to and from the film holder 14 for proper focusing. The copyboard 19 is mounted on a carrier 20 which in turn is supported by roller wheels 21 which also roll along upper rail 12 to allow proper positioning of the copyboard relative the the film holder 14 and the camera lens 17. In order to allow the operator to find the approximate position of the lens carrier 16 and the copyboard carrier 20, a scale 22 is mounted along the lower edge of upper rail 12 to be read by indicator 23 and 24 on the lens carrier 16 and the copyboard carrier 20, respectively. This scale is not a part of the invention and is provided only to aid the operator in making the initial set-up of the positioning apparatus, as will be described in greater detail hereinafter.

The above described parts may be considered typical of a commercial camera as is well known in the art, and it is therefore believed unnecessary to show and describe the camera itself in greater detail inasmuch as it forms no part of the present invention which relates to the positioning apparatus for locating the position of the lens carrier 16 and the copyboard carrier 20 the desired distances away from the film holder 14.

Figure 2:
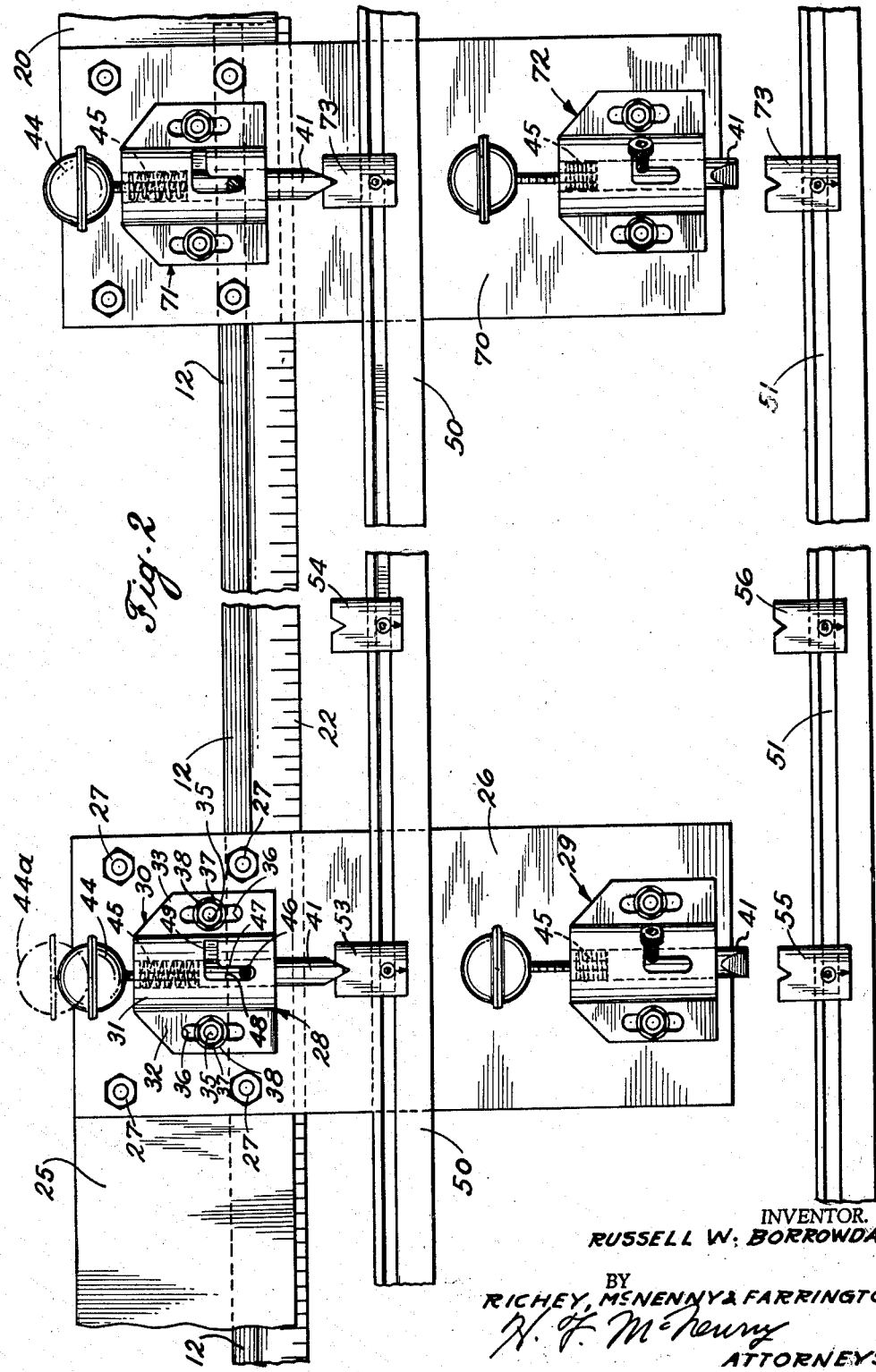
FIGURE 2 is an enlarged fragmentary view of a resetting device, as shown in FIGURE 1.

The positioning apparatus for the copyboard carrier is identical to that of the lens carrier and hence only the apparatus for positioning the lens carrier will be described in detail. As can be seen in FIGURES 1 and 2, the lens carrier 16 has a projecting support portion 25 projecting outward from the lower end of the lens carrier 16 above the upper rail 12. A flat mounting plate 26 is attached to this support portion 25 by means of suitable screws 27 and projects downward on the outer side of the upper rail 12. This mounting plate serves to support upper and lower plunger units 28 and 29 which lie in vertical alignment on the upper and lower ends of the mounting plate. Since both of these plunger units are identical in structure, only the specific construction of the upper unit 28 will be described in detail.

The upper plunger unit 28 includes a housing 30 having a central body portion 31 and projecting ears 32 and 33. The housing 30 is secured to the mounting plate 26 by means of a pair of studs 35 fixed in the mounting plate and extending outward through elongated openings 36 formed in the ears 32 and 33. The fastening is completed by means of nuts 37 and associated washers 38 which are secured on the outer end of the studs in the usual manner. The reason that holes 96 are elongated is to allow the housing 30 to be properly positioned vertically on the mounting plate.

Figure 3:
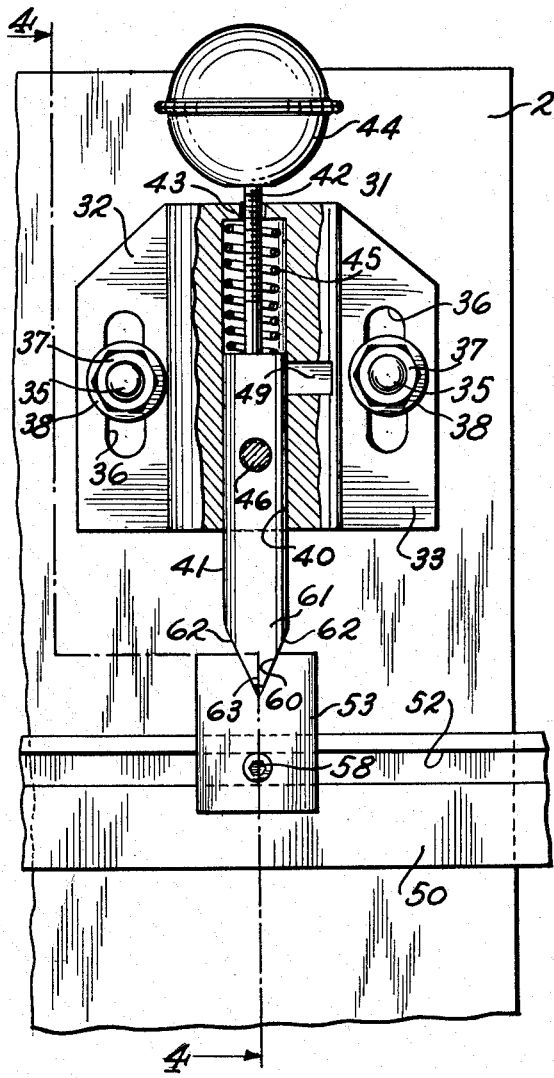
FIGURE 3 is a fragmentary detailed view with parts broken away showing the construction of the positioning plunger.
Figure 4:
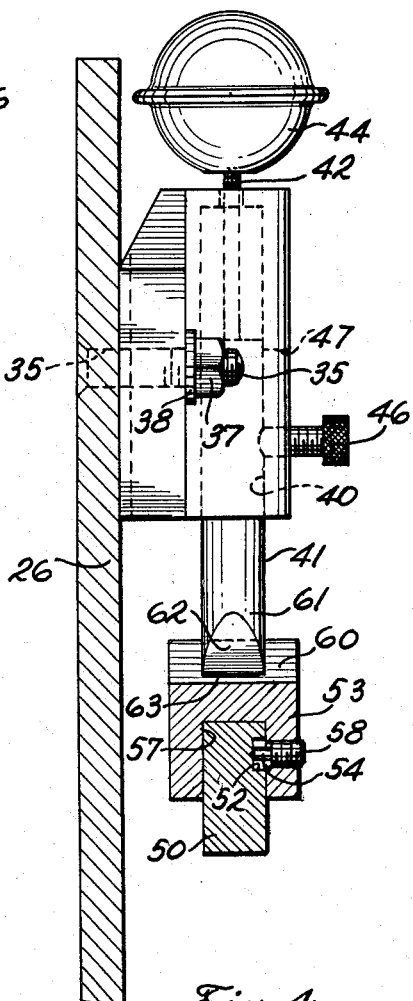
FIGURE 4 is a section taken along the line 4—4 of FIGURE 3 and showing the operation of the plunger and one of the detent blocks.

As is shown most clearly in FIGURES 3 and 4, the central body portion 31 is provided with a vertical bore 40 which is open at its lower end and has a reduced portion 43 at its upper end. A plunger 41 is fitted within bore 40 so as to be freely slidable along the axis of the bore but having a sufficiently close fit so as to eliminate any radial play between the plunger and the housing. The plunger 41 has a shank portion 42 which extends upwardly through the reduced portion 43 and has a ball or operating knob 44 secured on its outer end. A coil spring 45 of the compression type is carried within bore 40 above plunger 41 and surrounding the shank portion 42. This spring 45 abuts at its upper end against the reduced portion 43 to urge plunger 41 in a downward direction.

In order to retain plunger 41 within the bore 40 against the force of spring 45, the plunger is provided with a screw 46 which extends radially outward and passes through a slot 47 formed in the central body portion 31. As best seen in FIGURE 2, slot 47 is formed in the shape of an inverted L comprising a vertical portion 48 cut in the front section of central body portion 31 and connected at its upper end to a horizontal portion 49 which extends for a short distance circumferentially about bore 40 toward ear 33. When screw 46 is within the vertical portion 48, plunger 41 is allowed a limited vertical movement. When knob 44 is raised to the upper position, as shown in dashed lines 44a, the plunger may be rotated so as to allow screw 46 to pass into horizontal portion 49 thereby retaining the plunger in the upward or retracted position.

As can be seen best in FIGURE 1, a pair of mounting bars 50 and 51 are secured at each end in the upright frame members 10 and 11, and extend horizontally one above the other parallel to upper rail 12, each being located a spaced distance below the plunger units 28 and 29, respectively. As best seen in FIGURE 4, these mounting bars are approximately rectangular in cross section and carry a shallow groove 52 along their outer surface just below the upper edge. These mounting bars are adapted to receive the detent blocks indicated at 53, 54, 55, and 56. These detent blocks, which are all identical in shape, have a rectangular channel 57 cut in the lower portion so as to slip over the upper portion of a mounting bar. The outer side of the detent block has a set screw 58 threaded in the block and having a point portion 59 which engages groove 52 to clamp the block in position when the set screw 58 is tightened.

The upper surface of each of the detent block carries a transverse V-groove 60 which is conformable to a pointed portion 61 formed on the end of plunger 41. It will be noted that pointed portion 61 is formed by tapered flat sides 62 which intersect the blunted tip 63. The purpose of the blunt tip 63 is to insure that the plunger 41 will seat only on the tapered sides 62 within the V-groove 60 to insure accurate positioning.

It will also be noted that the copyboard carrier 20 is likewise fitted with a mounting plate 70 and plunger units 71 and 72 which are in structure and function identical with units 28 and 29 associated with the lens carrier 16. The plunger units 71 and 72 cooperate with an additional set of detent blocks 73 also carried on mounting bars 50 and 51 in the same manner as detent blocks 53, 54, 55, and 56.

Inasmuch as the operation of the position setting devices is the same in both structure, function, and operation for both the lens carrier 16 and the copyboard carrier 20, the operation will be described only for the lens carrier 16, it being understood that the same operations are performed for adjusting the position of the copyboard carrier. To obtain the proper setting of the lens carrier, a detent block 53 is slipped over the upper surface of mounting bar 50 and the plunger 41 is lowered until the pointed portion 61 makes a firmly seated contact with V-groove 60. Since the set screw 58 at this time is loose, the operator may then move the lens carrier 16 along the rails 12 until he has obtained the precise location he desires. Since the plunger 41 is engaged with the detent block, and the detent block has not been clamped on the mounting bar, while the operator is performing this positioning it will be seen that the detent block 53 will slide along the mounting bar 50 without binding or restriction. After the operator has located his desired position exactly, he tightens set screw 58 to clamp the detent block 53 tightly on the mounting bar. When this is done, detent block 53 is now a permanent record of this particular position.

Whenever it is desired to obtain another position for the lens carrier, the plunger 41 is retracted from the detent block 53 by lifting handle 44 and then rotating the handle so that screw 46 slides over onto horizontal slot portion 49 to retain the plunger in the retracted position. To locate another new position, the operator will then fasten another detent block 54 in position in the same manner as used with detent block 53.

Whenever it is desired to return to the position determined by detent block 53, the operator lifts the plunger 41 to the retracted position and moves the lens carrier 16 until the plunger 41 is approximately centered over the V-groove 60 in block 53. He then rotates ball 44 so that screw 46 lies in the vertical slot portion 48 and allows the plunger to descend under the pressure of spring 45 downwardly to begin to engage the V-groove. Now since this approximate position does not, except by chance, precisely correspond to the true position, one of the sides 62 of pointed portion 61 will contact the corresponding side of V-groove 60. The operator then moves the lens carrier 16 under a very fine adjustment until the plunger 41 under the downward force of spring 45 has been fully seated so that both sides 62 are in full contact with both sides of the V-groove 60. When this is done, the lens carrier 16 has been reset to the exact position as before with a high degree of accuracy, and without need to resort to reading any scales to determine the proper position.

The reason for providing more than one set of mounting bars and the associated plunger units for each carrier is that because of the necessary width of the detent block, it might occur that two positions are desired for a carrier having a spacing which is less than the width of the detent block. As is shown in FIGURE 2, it will be noted that blocks 53 and 55 on upper and lower mounting bars 50 and 51, respectively, are offset by only a slight distance. Detent block 55 could not be located in the equivalent position on the mounting bar 50 due to interference from detent block 53, but by providing a separate mounting bar and plunger unit, such a detent block may be set on the lower bar without interference, and two adjacent but distinct positions can be obtained with any degree of spacing desired. Of course if such spacing will not be encountered with a particular set-up of a camera, only the one mounting bar and one plunger mechanism will be required for each carriage, and on the other hand, if three or more positions are required whose spacing lies within the width of a detent block, each carrier may be provided with three or more plunger units, and three or more corresponding mounting bars may be used.

An alternative arrangement for mounting detent blocks is shown in FIGS. 5 through 8. This arrangement allows the blocks to be readily removed and replaced in the same precise position, and also provides a micrometer adjustment for the detent block.

Shown in FIG. 5 is a main or fixed mounting bar 80 corresponding to either of the upper and lower mounting bars 50 and 51 as shown in FIG. 1. A short detachable mounting bar 81 is secured on the top surface of mounting bar 80 by means of cap screws 82. The detachable mounting bar 81 is positively positioned longitudinally with respect to mounting bar 80 by means of a tapered locating pin 83 on the underside of the detachable mounting bar 81. Locating pin 83 fits within a V-groove 84 on the upper surface of mounting bar 80, and is shaped to bear against both sides of the V-groove 84 when the cap screws 82 are drawn down tight. The detachable mounting bar 81 is substantially rectangular in shape, having a flat top surface 86 and an outer side surface 87 which extends substantially flush with the side of the mounting bar 80. The outer side surface 87 is provided with rectangular upper and lower channels or grooves, 90 and 91, respectively. A detent block 89 similar to the detent blocks 73 can be mounted on the top of the detachable mounting bar 81 and clamped in place by means of a set screw 88 which engages the upper groove 90. The detent block 89 is employed with a plunger unit such as upper plunger unit 28 in the aforedescribed manner, and it will be seen that since the block is removable with the detachable mounting bar, a plurality of detachable mounting bars can be provided with each bar having a detent block which differs in its position by only a slight distance from the positions of the other blocks when clamped in place on the fixed mounting bar. This arrangement allows the camera to be set up for a certain job using the detent block on the detachable mounting bar, after which the particular bar can be removed and stored for a future rapid set up of the same job.

The detachable mounting bar 81 may also be provided with a detent block which is positioned by a micrometer axially along the mounting bar to obtain the very small and precise increments of spacing which are required in making overlays and the like. A stationary mounting block 95 is mounted on the top of detachable mounting bar 81 and held in place by means of a set screw 96 which bears on the bottom of the upper groove 90. A micrometer 100 having a frame portion 101 is secured to the mounting block 95 by means of a clamp bar 98 and a clamping screw 99. By mounting the micrometer on the outer face of the mounting block 95, the micrometer will be positioned outwardly of the detent blocks and therefore not interfere with the use of the plunger unit. The micrometer 100 is provided with a spindle 102 which is moved axially by rotation of the sleeve 103.

A sliding detent block 110 is mounted on the top surface 86 of detachable mounting bar 81 with sufficient clearance to allow it to be freely slidable along the bar. To retain the detent block 110 in place on the mounting bar, it is provided with a cap 113 on the bottom of its outer depending side 112. Cap 113 is secured to the detent block by screws 114 and bears against the upper side 92 of lower groove 91. By adjustment of the screws 114 the sliding detent block 110 can be made a smooth sliding fit along the mounting bar without any free play or backlash.

The micrometer 100 has an anvil portion 105 which is secured to the side of sliding detent block 110 by means of a clamp bar 108 and a clamping screw 109. A lock screw 106 on the micrometer is adapted to clamp the spindle 102 in a selected position to prevent accidental change of adjustment. If desired, the sliding detent block 110 can also be clamped in place by means of a set screw 111 which engages the bottom of the upper groove 90. A transverse V-groove 116 on the upper side of sliding detent block 110 is provided for engagement with the plunger unit in the aforedescribed manner.

It will be seen that the sliding detent block 110 can be locked in position along the detachable mounting bar 81 by use of either the lock screw 1 or 6 or the set screw 111. Thus the sliding detent block 110 can be adjusted to a position with the precision of the micrometer 100 and clamped in position in the same manner as the detent block 89. However, when it is necessary to compensate in focusing for such factors as the thickness of the paper or overlay, simple adjustment of the micrometer 100 can be made according to the thickness to allow the sliding detent block 110 to be accurately shifted in position by only a few thousandths of an inch.

It is believed that the foregoing description, in conjunction with the drawings, will allow others skilled in the art to understand and practice the invention, which is not limited to the abovedescribed embodiments, but is defined in the scope of the following claims.

What is claimed is:

1. A camera adjustment including a supporting frame for a camera, a rail connected to said frame, a carriage member slidable along said rail, a fixed mounting bar attached to said frame in parallel alignment with said rail, a plurality of second mounting bars each selectively mountable on said fixed mounting bar, a tapered locating element extending from one of said mounting bars shaped to fit within and bear against both sides of a V-groove in the other said mounting bar, a detent member movably carried by said carriage member, spring means resiliently urging said detent member toward said mounting bars, a plurality of detent blocks adjustably fixed to said second mounting bars, a V-groove on said detent block to receive said detent member, whereby engagement of said detent member with said V-groove positions said carriage member relative to said frame.

2. A camera adjustment including a supporting frame for a camera, a rail connected to said frame, a carriage member slidable along said rail, a mounting bar attached to said frame in parallel relation to said rail, a detent member movably carried by said carriage member, and spring means resiliently urging said detent member toward said mounting bar, a detent block adapted to be selectively positioned on said mounting bar, first clamp means to lock said detent block relative to said mounting bar, a mounting block movable along said mounting bar, second clamp means for locking said mounting block relative to said mounting bar, micrometer screw means connected to said detent block and mounting block to selectively position said detent block on said mounting bar while said first clamp means are released, a V-grove on said detent block to receive said detent member, whereby engagement of said detent member with said V-groove positions said carriage member relative to said frame.

3. A camera adjustment including a supporting frame for a camera, a rail connected to said frame, a carriage member slidable along said rail, a mounting bar attached to said frame in parallel relation to said rail, a detent member movably carried by said carriage member, and spring means resiliently urging said detent member toward said mounting bar, a detent block adapted to be selectively positioned on said mounting bar, a mounting block movable along said mounting bar, clamp means for locking said mounting block relative to said mounting bar, micrometer screw means connected to said detent block and said mounting block to selectively position said detent block on said mounting bar while said clamp means lock said mounting block against movement along said mounting bar, a V-groove on said detent block to receive said detent member, whereby engagement of said detent member with said V-groove positions said carriage member relative to said frame.

(References on following page)

References Cited in the file of this patent

UNITED STATES PATENTS

| | | |
|---|---|---|
| 1,351,618 | Byron | Aug. 31, 1920 |
| 1,644,781 | Holman et al. | Oct. 11, 1927 |
| 1,787,662 | Boedicker | Jan. 6, 1931 |
| 1,941,624 | Salchow | Jan. 2, 1934 |
| 1,972,574 | Salchow | Sept. 4, 1934 |
| 2,317,692 | Morin | Apr. 27, 1943 |
| 2,725,800 | Dewhurst | Dec. 6, 1955 |
| 2,788,705 | Huebner | Apr. 16, 1957 |
| 2,898,829 | Wirtz et al. | Aug. 11, 1959 |

FOREIGN PATENTS

| | | |
|---|---|---|
| 743,141 | France | Jan. 6, 1933 |